US009960922B2

(12) United States Patent
Ekberg et al.

(10) Patent No.: US 9,960,922 B2
(45) Date of Patent: May 1, 2018

(54) DEVICE-TO-DEVICE COMMUNICATION SECURITY WITH AUTHENTICATION CERTIFICATES

(71) Applicant: Nokia Technologies Oy, Espoo (FI)

(72) Inventors: Jan-Erik Ekberg, Vantaa (FI); Mikko Aleksi Uusitalo, Helsinki (FI); Zexian Li, Espoo (FI)

(73) Assignee: Nokia Technologies Oy, Espoo (FI)

( * ) Notice: Subject to any disclaimer, the term of this patent is extended or adjusted under 35 U.S.C. 154(b) by 123 days.

(21) Appl. No.: 14/896,466

(22) PCT Filed: Jun. 25, 2013

(86) PCT No.: PCT/IB2013/055217
§ 371 (c)(1),
(2) Date: Dec. 7, 2015

(87) PCT Pub. No.: WO2014/207506
PCT Pub. Date: Dec. 31, 2014

(65) Prior Publication Data
US 2016/0142214 A1    May 19, 2016

(51) Int. Cl.
*H04L 9/32* (2006.01)
*H04W 12/04* (2009.01)
(Continued)

(52) U.S. Cl.
CPC ............. *H04L 9/3263* (2013.01); *H04L 9/14* (2013.01); *H04W 12/04* (2013.01); *H04W 12/06* (2013.01);
(Continued)

(58) Field of Classification Search
CPC ................. H04L 9/3263; H04L 9/14
(Continued)

(56) References Cited

U.S. PATENT DOCUMENTS

2006/0105741 A1* 5/2006 Suh ..................... H04L 63/0471
455/410
2008/0196086 A1  8/2008 Shintani et al.
(Continued)

FOREIGN PATENT DOCUMENTS

EP    2663051 A1    11/2013
GB    2494460 A     3/2013
(Continued)

OTHER PUBLICATIONS

International Search Report and Written Opinion received for corresponding Patent Cooperation Treaty Application No. PCT/IB2013/055217, dated Apr. 7, 2014, 15 pages.
(Continued)

*Primary Examiner* — Haresh N Patel
(74) *Attorney, Agent, or Firm* — Mintz Levin Cohn Ferris Glovsky and Popeo, P.C.

(57) ABSTRACT

An apparatus comprising: a requester configured to request a certificate comprising at least one identifier associated with the apparatus from at least one network node; a first receiver configured to receive the certificate from the at least one network node; and a forwarder configured to forward the certificate to at least one further apparatus; a second receiver configured to receive a further certificate from the further apparatus, the further certificate comprising at least one further identifier associated with the further apparatus; and an authenticated configured to authenticate the further apparatus based on the further certificate.

13 Claims, 5 Drawing Sheets

(51) Int. Cl.
  *H04W 12/06* (2009.01)
  *H04L 9/14* (2006.01)
  *H04L 29/06* (2006.01)
  *H04W 76/02* (2009.01)

(52) U.S. Cl.
  CPC ...... *H04L 63/0823* (2013.01); *H04L 2209/24* (2013.01); *H04L 2209/64* (2013.01); *H04L 2209/80* (2013.01); *H04W 76/023* (2013.01)

(58) Field of Classification Search
  USPC .......................................... 713/175
  See application file for complete search history.

(56) References Cited

U.S. PATENT DOCUMENTS

| | | | |
|---|---|---|---|
| 2009/0119760 A1* | 5/2009 | Hung | H04L 63/0823 726/6 |
| 2009/0254749 A1* | 10/2009 | Li | G06F 21/34 713/169 |
| 2010/0217975 A1* | 8/2010 | Grajek | G06F 21/445 713/157 |
| 2011/0258327 A1 | 10/2011 | Phan et al. | |
| 2012/0089839 A1* | 4/2012 | Qiu | H04L 9/006 713/171 |
| 2012/0102315 A1 | 4/2012 | Holtmanns et al. | |
| 2012/0314866 A1 | 12/2012 | Horneman et al. | |
| 2013/0125224 A1 | 5/2013 | Kaufman | |
| 2014/0064252 A1* | 3/2014 | Lim | H04W 72/048 370/331 |
| 2014/0282834 A1* | 9/2014 | Guinan | H04L 63/20 726/1 |

FOREIGN PATENT DOCUMENTS

| | | |
|---|---|---|
| WO | 2010030515 A2 | 3/2010 |
| WO | 2011/147462 A1 | 12/2011 |

OTHER PUBLICATIONS

"Study on LTE Device to Device Proximity Services", 3GPP TSG-RAN meeting #58, RP-122009, Agenda: 13.2, Qualcomm Incorporated, 6 Pages.

"3rd Generation Partnership Project; Technical Specification Group Services and System Aspects; Feasibility study for Proximity Services (ProSe) (Release 12)", 3GPP TR 22.803, V12.1.0, Mar. 2013, pp. 1-45.

Al-Bakri et al., "Securing Peer-to-peer Mobile Communications Using Public Key Cryptography: New Security Strategy", International Journal of the Physical Sciences, vol. 6(4), Feb. 18, 2011, pp. 930-938.

Extended European Search Report received for corresponding European Patent Application No. 13888138.8, dated Feb. 2, 2017, 7 pages.

\* cited by examiner

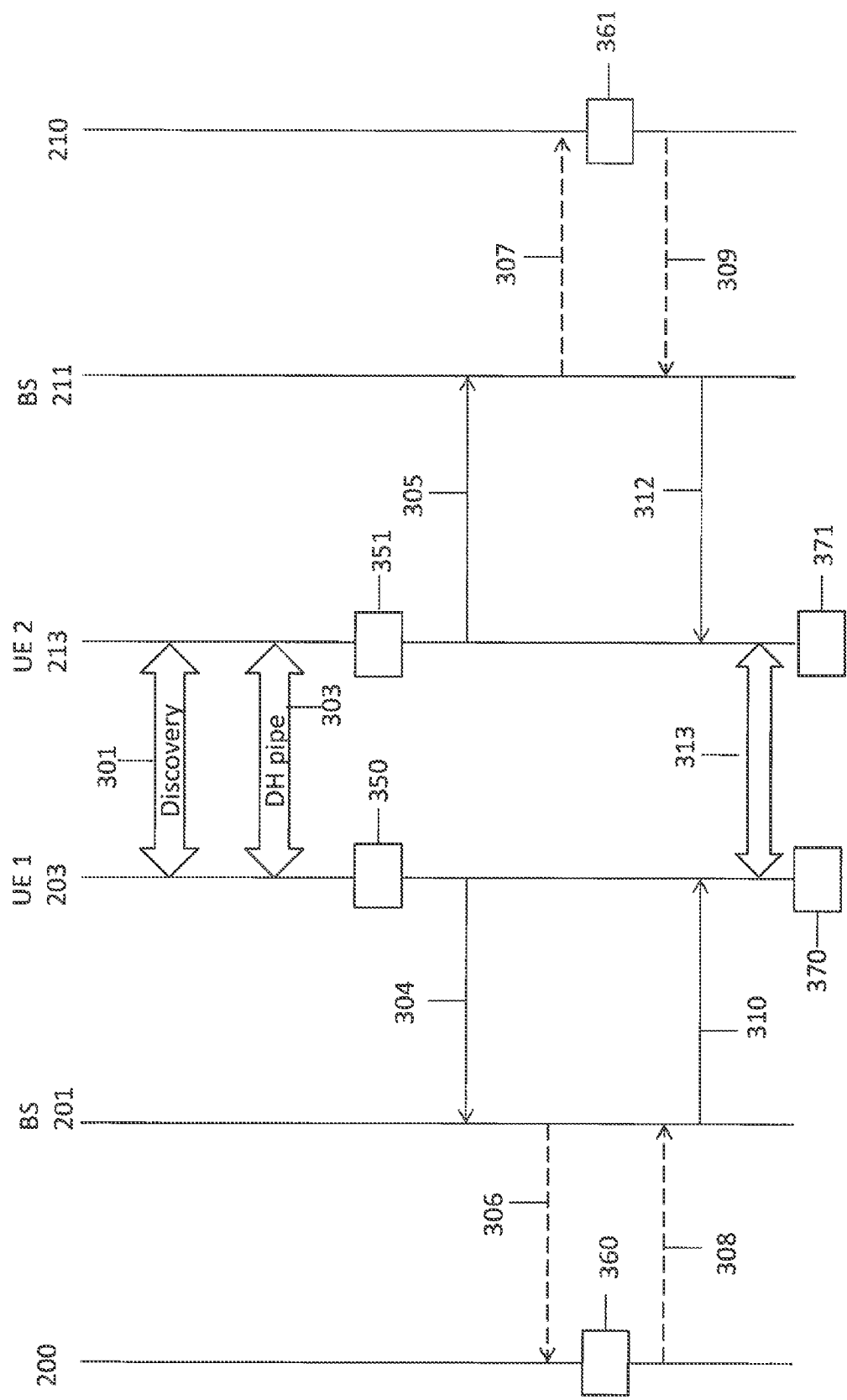

DEVICE-TO-DEVICE COMMUNICATION SECURITY WITH AUTHENTICATION CERTIFICATES

RELATED APPLICATION

This application was originally filed as Patent Cooperation Treaty Application No. PCT/IB2013/055217 filed Jun. 25, 2013.

FIELD

This disclosure relates to device to device communication security. This disclosure relates further relates to, but is not limited to, device to device communication security in a cellular communication system.

BACKGROUND

A communication system can be seen as a facility that enables communications between two or more nodes or devices such as fixed or mobile communication devices, access points (AP) such as base stations, relays, servers and so on. A communication system and compatible communicating entities typically operate in accordance with a given standard or specification which sets out what the various entities associated with the system are permitted to do and how that should be achieved. For example, the standards, specifications and related protocols can define the manner how various devices shall communicate with each other, how various aspects of the communications shall be implemented and how the devices shall be configured.

Signals can be carried on wired or wireless carriers. Examples of wireless communication systems include architectures that are standardized by the 3rd Generation Partnership Project (3GPP). A recent development in this field is often referred to as the long-term evolution (LTE) of the Universal Mobile Telecommunications System (UMTS) radio-access technology. Further developments of the communication systems are expected.

A communication device can be provided with an appropriate signal receiving and transmitting arrangement for enabling communications with other devices. Typically a communication device is used for enabling receiving and transmission of communications such as speech and data. A user can access wirelessly a communication system by means of an appropriate wireless communication device or terminal, often referred to as user equipment (UE). Other types of wireless communication devices are also known, for example various access points, relays, and so on that are capable of communicating wirelessly with other devices.

New services and communication architectures are emerging. For example, proximity-based applications and services have been proposed. The introduction of a proximity services (ProSe) capability in systems such as LTE can be used to enable use of the proximity-based applications. One aspect of proximity services is devices capable of device-to-device communications (D2D).

Device-to-device communication in cellular networks can be used to off-load the communication from core network to high-speed local connection, but also to form local, isolated communicating groups for e.g. emergency services, among friends or even as a personal-area network as discussed in 3GPP TR22.803. Many of these networks carry at least private data, in some cases also confidential information. Thus proper protection against e.g. eavesdropping is a wanted feature.

The Trusted Computing Group is a forum that standardizes security elements for trustworthy computing. One of the standards defines the TPM—the trusted platform module—which is a hardware component in a computing device that will be placed in the trusted computing base of the device, and consequently provide standardized security services to the OS and applications.

It is noted that the above discussed issues are not limited to any particular communication environment and station apparatus but may occur in any appropriate system.

STATEMENT

Embodiments of the invention aim to address one or several of the above issues.

In accordance with an embodiment there is provided a method comprising: requesting a certificate comprising at least one identifier associated with a first apparatus from at least one network node; receiving at the first apparatus the certificate from the at least one network node; and forwarding the certificate to a further apparatus; receiving a further certificate from the further apparatus, the further certificate comprising at least one further identifier associated with the further apparatus; and authenticating the further apparatus based on the further certificate.

The method may further comprise: discovering at a first apparatus the further apparatus; and establishing between the first apparatus and the further apparatus a security association.

Establishing between the first apparatus and the further apparatus a security association may comprise establishing a cryptographic pipe between the first apparatus and the further apparatus.

Forwarding the certificate to the further apparatus may comprise: encrypting the certificate with the cryptographic pipe key; and transmitting the encrypted certificate to the further apparatus.

Receiving a further certificate from the further apparatus may comprise: receiving an encrypted certificate from the further apparatus; and generating a further certificate from the encrypted certificate by decrypting the encrypted certificated based on a key from the cryptographic pipe.

Authenticating the further apparatus based on the further certificate may comprise determining whether the at least one further identifier associated with the further apparatus matches a value stored within the first apparatus.

The certificate comprising at least one identifier associated with the first apparatus may comprise at least one of: an asymmetric public key; a public identifier derived from a Diffie-Hellman group element originating from the first apparatus; an identifier based on an established security association between the first apparatus and the further apparatus; a location of an access point to which the first apparatus is associated with; a phone number associated with the first apparatus; an International Mobile Subscriber Identity associated with the first apparatus; and a Temporary Mobile Subscriber Identity associated with the first apparatus.

The further certificate comprising at least one further identifier associated with the further apparatus may comprise at least one of: an asymmetric public key; a public identifier derived from a Diffie-Hellman group element originating from the further apparatus; an identifier based on an established security association between the first apparatus and the further apparatus; a location of an access point to which the further apparatus is associated with; a phone number associated with the further apparatus; an International Mobile Subscriber Identity associated with the further apparatus; and a Temporary Mobile Subscriber Identity associated with the further apparatus.

The method may further comprise: requesting from the further apparatus the further certificate comprising at least one identifier associated with the further apparatus from at least one further network node; receiving at the further apparatus the further certificate from the at least one further network node; and forwarding the further certificate from the further apparatus to the apparatus; receiving at the further apparatus the certificate from the first apparatus; authenticating at the further apparatus the apparatus based on the certificate.

According to a second aspect there is provided a method comprising: receiving a request from an apparatus for a certificate comprising at least one identifier associated with the apparatus; generating the certificate comprising the at least one identifier associated with the apparatus; and transmitting the certificate comprising the at least one identifier associated with the apparatus, wherein the certificate is configured to be exchanged between apparatuses to authenticate the apparatus at a further apparatus.

Generating the certificate comprising the at least one identifier associated with the apparatus may comprise at least one of: determining an asymmetric public key associated with the apparatus; determining a Diffie-Hellman group element originating from the apparatus; determining a location of an access point to which the apparatus is associated with; determining a phone number associated with the apparatus; determining an International Mobile Subscriber Identity associated with the apparatus; and determining a Temporary Mobile Subscriber Identity associated with the apparatus.

Receiving a request from an apparatus for a certificate comprising at least one identifier associated with the apparatus may comprise receiving an established security association between the apparatus and the further apparatus and generating the certificate comprising the at least one identifier associated with the apparatus may comprise generating an identifier based on the established security association between the apparatus and the further apparatus.

According to a third aspect there is provided an apparatus comprising: means for requesting a certificate comprising at least one identifier associated with the apparatus from at least one network node; means for receiving the certificate from the at least one network node; and means for forwarding the certificate to further apparatus; means for receiving a further certificate from the further apparatus, the further certificate comprising at least one further identifier associated with the further apparatus; and means for authenticating the further apparatus based on the further certificate.

The apparatus may further comprise: means for discovering the further apparatus; and means for establishing between the apparatus and the further apparatus a security association.

The means for establishing between the apparatus and the further apparatus a security association may comprise means for establishing a cryptographic pipe between the apparatus and the further apparatus.

The means for forwarding the certificate to the further apparatus may comprise: means for encrypting the certificate with the cryptographic pipe key; and means for transmitting the encrypted certificate to the further apparatus.

The means for receiving a further certificate from the further apparatus may comprise: means for receiving an encrypted certificate from the further apparatus; and means for generating a further certificate from the encrypted certificate by decrypting the encrypted certificated based on a key from the cryptographic pipe.

The means for authenticating the further apparatus based on the further certificate may comprise determining whether the at least one further identifier associated with the further apparatus matches a value stored within the apparatus.

The certificate comprising at least one identifier associated with the first apparatus may comprise at least one of: an asymmetric public key; a public identifier derived from a Diffie-Hellman group element originating from the apparatus; an identifier based on an established security association between the apparatus and the further apparatus; a location of an access point to which the apparatus is associated with; a phone number associated with the apparatus; an International Mobile Subscriber Identity associated with the apparatus; and a Temporary Mobile Subscriber Identity associated with the apparatus.

The further certificate comprising at least one further identifier associated with the further apparatus may comprise at least one of: an asymmetric public key; a public identifier derived from a Diffie-Hellman group element originating from the further apparatus; an identifier based on an established security association between the apparatus and the further apparatus; a location of an access point to which the further apparatus is associated with; a phone number associated with the further apparatus; an International Mobile Subscriber identity associated with the further apparatus; and a Temporary Mobile Subscriber Identity associated with the further apparatus.

A system may comprise the apparatus as discussed herein, and the further apparatus, wherein the further apparatus may comprise: means for requesting the further certificate comprising at least one identifier associated with the further apparatus from at least one further network node; means for receiving the further certificate from the at least one further network node; means for forwarding the further certificate to the apparatus; means for receiving the certificate from the apparatus; and means for authenticating the apparatus based on the certificate.

According to a fourth aspect there is provided an apparatus comprising: means for receiving a request from a further apparatus for a certificate comprising at least one identifier associated with the further apparatus; means for generating the certificate comprising the at least one identifier associated with the further apparatus; and means for transmitting the certificate comprising the at least one identifier associated with the further apparatus, wherein the certificate is configured to be exchanged between further apparatuses to authenticate the further apparatus at a second further apparatus.

The means for generating the certificate comprising the at least one identifier associated with the further apparatus may comprise at least one of: means for determining an asymmetric public key associated with the further apparatus; means for determining a Diffie-Hellman group element originating from the further apparatus; means for determining a location of an access point to which the further apparatus is associated with; means for determining a phone number associated with the further apparatus; means for determining an International Mobile Subscriber Identity associated with the further apparatus; and means for determining a Temporary Mobile Subscriber Identity associated with the further apparatus.

The means for receiving a request from an apparatus for a certificate comprising at least one identifier associated with the apparatus may comprise means for receiving an established security association between the apparatus and the further apparatus and wherein the means for generating the certificate comprising the at least one identifier associated with the apparatus may comprise means for generating an identifier based on the established security association between the apparatus and the further apparatus.

According to a fifth aspect there is provided an apparatus comprising at least one processor and at least one memory including computer program code for one or more programs, the at least one memory and the computer program code configured to, with the at least one processor, cause the apparatus at least to: request a certificate comprising at least one identifier associated with the apparatus from at least one network node; receive the certificate from the at least one network node; forward the certificate to a further apparatus; receive a further certificate from the further apparatus, the further certificate comprising at least one further identifier associated with the further apparatus; and authenticate the further apparatus based on the further certificate.

The apparatus may further be caused to: discover the further apparatus; and establish between the apparatus and the further apparatus a security association.

Establishing between the apparatus and the further apparatus a security association may cause the apparatus to establish a cryptographic pipe between the apparatus and the further apparatus.

Forwarding the certificate to the further apparatus may cause the apparatus to: encrypt the certificate with the cryptographic pipe key; and transmit the encrypted certificate to the further apparatus.

Receiving a further certificate from the further apparatus may cause the apparatus to: receive an encrypted certificate from the further apparatus; and generate a further certificate from the encrypted certificate by decrypting the encrypted certificated based on a key from the cryptographic pipe.

Authenticating the further apparatus based on the further certificate may cause the apparatus to determine whether the at least one further identifier associated with the further apparatus matches a value stored within the apparatus.

The certificate comprising at least one identifier associated with the first apparatus may comprise at least one of: an asymmetric public key; a public identifier derived from a Diffie-Hellman group element originating from the apparatus; an identifier based on an established security association between the apparatus and the further apparatus; a location of an access point to which the apparatus is associated with; a phone number associated with the apparatus; an International Mobile Subscriber Identity associated with the apparatus; and a Temporary Mobile Subscriber Identity associated with the apparatus.

The further certificate comprising at least one further identifier associated with the further apparatus may comprise at least one of: an asymmetric public key; a public identifier derived from a Diffie-Hellman group element originating from the further apparatus; an identifier based on an established security association between the apparatus and the further apparatus; a location of an access point to which the apparatus is associated with; a phone number associated with the further apparatus; an International Mobile Subscriber Identity associated with the further apparatus; and a Temporary Mobile Subscriber Identity associated with the further apparatus.

A system may comprise the apparatus as discussed herein, and the further apparatus, wherein the further apparatus may comprise at least one processor and at least one memory including computer program code for one or more programs, the at least one memory and the computer program code configured to, with the at least one processor, which may cause the further apparatus at least to: request the further certificate comprising at least one identifier associated with the further apparatus from at least one further network node; receive the further certificate from the at least one further network node; forward the further certificate to the apparatus; receive the certificate from the apparatus; and authenticate the apparatus based on the certificate.

According to a sixth aspect there is provided an apparatus comprising at least one processor and at least one memory including computer program code for one or more programs, the at least one memory and the computer program code configured to, with the at least one processor, cause the apparatus at least to: receive a request from a further apparatus for a certificate comprising at least one identifier associated with the further apparatus; generate the certificate comprising the at least one identifier associated with the further apparatus; and transmit the certificate comprising the at least one identifier associated with the further apparatus, wherein the certificate is configured to be exchanged between further apparatuses to authenticate the further apparatus at a second further apparatus.

Generating the certificate comprising the at least one identifier associated with the further apparatus may cause the apparatus to perform at least one of: determine an asymmetric public key associated with the further apparatus; determine a Diffie-Hellman group element originating from the further apparatus; determine a location of an access point to which the further apparatus is associated with; determine a phone number associated with the further apparatus; determine an International Mobile Subscriber Identity associated with the further apparatus; and determine a Temporary Mobile Subscriber Identity associated with the further apparatus.

Receiving a request from an apparatus for a certificate comprising at least one identifier associated with the apparatus may cause the apparatus to receive an established security association between the apparatus and the further apparatus and wherein generating the certificate comprising the at least one identifier associated with the apparatus may cause the apparatus to generate an identifier based on the established security association between the apparatus and the further apparatus.

According to a seventh aspect there is provided an apparatus comprising: a requester configured to request a certificate comprising at least one identifier associated with the apparatus from at least one network node; a first receiver configured to receive the certificate from the at least one network node; a forwarder configured to forward the certificate to a further apparatus; a second receiver configured to receive a further certificate from the further apparatus, the further certificate comprising at least one further identifier associated with the further apparatus; and an authenticator configured to authenticate the further apparatus based on the further certificate.

The apparatus may further comprise: a discoverer configured to discover the further apparatus; and an associator configured to establish between the apparatus and the further apparatus a security association.

The associator may be configured to establish a cryptographic pipe between the apparatus and the further apparatus.

The forwarder may comprise: an encrypter configured to encrypt the certificate with the cryptographic pipe key; and a transmitter configured to transmit the encrypted certificate to the further apparatus.

The second receiver may comprise: a certificate receiver configured to receive an encrypted certificate from the further apparatus; and a decrypter configured to generate a further certificate from the encrypted certificate by decrypting the encrypted certificated based on a key from the cryptographic pipe.

The authenticator may be configured to determine whether the at least one further identifier associated with the further apparatus matches a known value stored within the apparatus.

The certificate comprising at least one identifier associated with the first apparatus may comprise at least one of: an asymmetric public key; a public identifier derived from a Diffie-Hellman group element originating from the apparatus; an identifier based on an established security association between the apparatus and the further apparatus; a location of an access point to which the apparatus is associated with; a phone number associated with the apparatus; an International Mobile Subscriber Identity associated with the apparatus; and a Temporary Mobile Subscriber Identity associated with the apparatus.

The further certificate comprising at least one further identifier associated with the further apparatus may comprise at least one of: an asymmetric public key; a public identifier derived from a Diffie-Hellman group element originating from the further apparatus; an identifier based on an established security association between the first apparatus and the further apparatus; a location of an access point to which the further apparatus is associated with; a phone number associated with the further apparatus; an International Mobile Subscriber Identity associated with the further apparatus; and a Temporary Mobile Subscriber Identity associated with the further apparatus.

A system may comprise the apparatus as discussed herein, and the further apparatus, wherein the further apparatus may comprise: a further apparatus requester configured to request the further certificate comprising at least one identifier associated with the further apparatus from at least one further network node; a further apparatus receiver configured to receive the further certificate from the at least one further network node; a further apparatus forwarder configured to forward the further certificate to the apparatus; a further apparatus second receiver configured to receive the certificate from the apparatus; and a further apparatus authenticator configured to authenticate the apparatus based on the certificate.

According to an eighth aspect there is provided an apparatus comprising: a receiver configured to receive a request from a further apparatus for a certificate comprising at least one identifier associated with the further apparatus; a certificate generator configured to generate the certificate comprising the at least one identifier associated with the further apparatus; and a transmitter configured to transmit the certificate comprising the at least one identifier associated with the further apparatus, wherein the certificate is configured to be exchanged between further apparatuses to authenticate the further apparatus at a second further apparatus.

The certificate generator may be configured to determine at least one of: an asymmetric public key associated with the further apparatus; a Diffie-Hellman group element originating from the further apparatus; a location of an access point to which the further apparatus is associated with; a phone number associated with the further apparatus; an international Mobile Subscriber Identity associated with the further apparatus; and a Temporary Mobile Subscriber Identity associated with the further apparatus.

The receiver may be configured to receive an established security association between the apparatus and the further apparatus and the certificate generator may be configured to generate an identifier based on the established security association between the apparatus and the further apparatus.

A computer program may comprise code means adapted to perform the steps of any of claims 1 to 11 when the program is run on a processor.

It should be appreciated that any feature of any aspect may be combined with any other feature of any other aspect.

SUMMARY OF FIGURES

Embodiments will now be described in further detail, by way of example only, with reference to the following examples and accompanying drawings, in which:

FIG. 4 shows a flowchart showing the operations within the further system according to some embodiments.

DESCRIPTION OF EXAMPLE EMBODIMENTS

In the following certain exemplifying embodiments are explained with reference to a wireless or mobile communication system serving mobile communication devices. Before explaining in detail the exemplifying embodiments, certain general principles of a wireless communication system, access systems thereof, and communication devices are briefly explained with reference to FIGS. 1 and 2a and 2b to assist in understanding the technology underlying the described examples.

Figure 1:
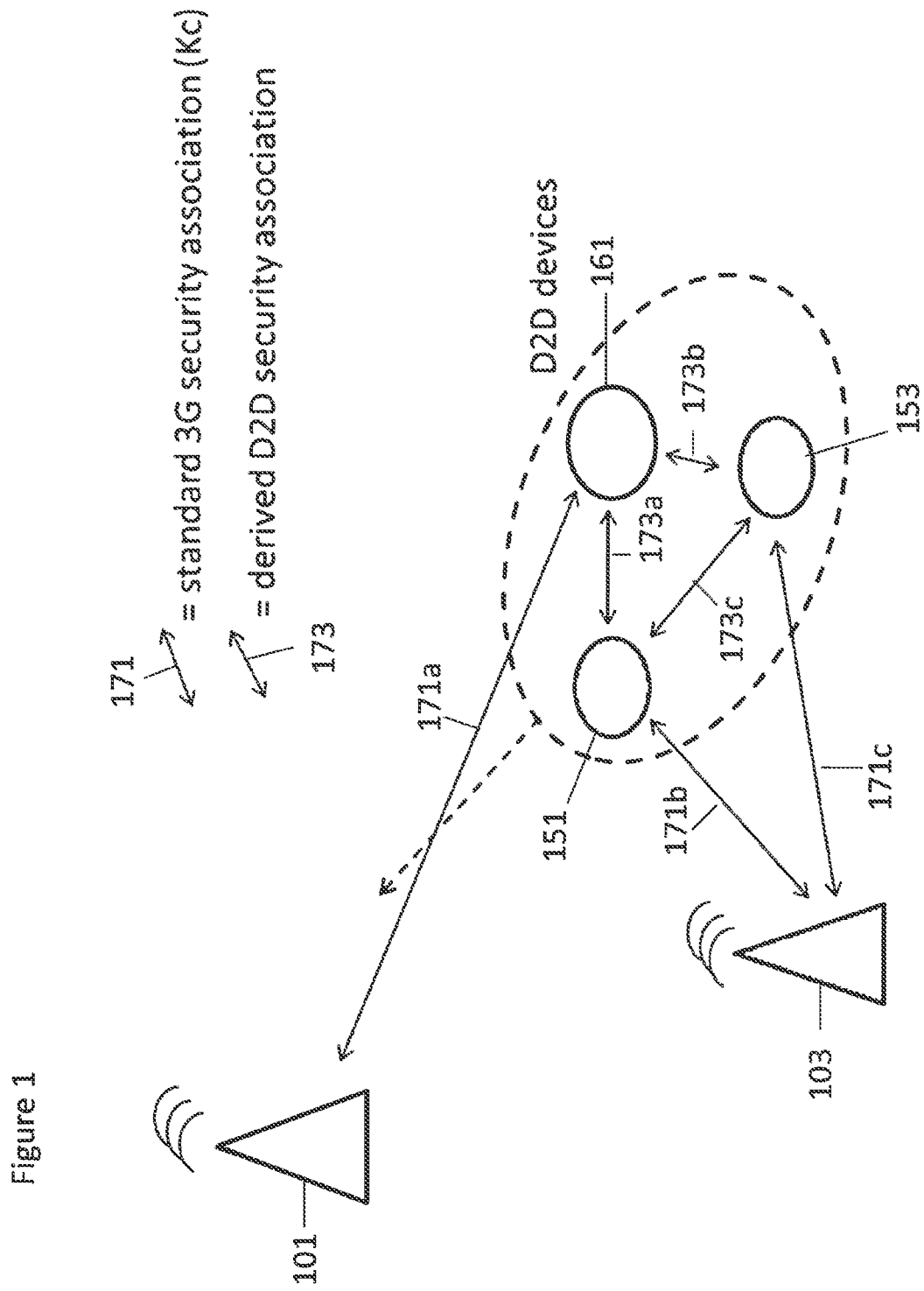
FIG. 1 shows a schematic diagram of a D2D system where certain embodiments can be implemented.

FIG. 1 shows an example cellular/D2D (device-to-device) network such as ably to operate embodiments as described herein. FIG. 1 shows a network comprising a first base station (BS) 101 belonging to a first operator and a first user equipment (UE) or D2D device 161 configured to communicate with the first base station 101 using a standard 3G security association (which may be identified by Kc) 171a. Furthermore the network comprises a second base station 103 potentially belonging to a second operator. The second base station 103 is configured to communicate via a standard 3G security association 171 to two further user equipment or (D2D devices) as shown in FIG. 1 by a second user equipment (D2D device) 151 and a third user equipment (D2D device) 153. The second user equipment 151 is configured to communicate via a second 3G (or suitable cellular) security association 171b with the second base station 103 and the third user equipment 153 is configured to communicate via a third 3G (or suitable cellular) security association 171c with the second base station 103.

Furthermore the user equipment operating as D2D device are configured to communicate with each other and as such the first, second and third user equipment (D2D devices) 161, 151 and 153 can be configured to communicate with the other D2D devices.

It would be understood that communication between the user equipment operating as D2D devices requires the generation of specific D2D security contexts. For example a first D2D security association 173a formed between the first user equipment (D2D device) 161 and the second user equipment (D2D) device 151, a second D2D security association 173b formed between the first user equipment (D2D) device 161 and the third user equipment (D2D device) 153 and a third D2D security association 173c derived between the second user equipment (D2D device) 151 and the third user equipment (D2D device) 153. As described herein these security associations are used to enable authentication between the D2D devices and in some embodiments to encrypt private data communicated between the devices.

In other words it is known how to provide a cryptographic key exchange (for example using a Diffie-Hellman method) and so set or establish a security association between the D2D devices and so establish a cryptographic pipe, however these methods fail to establish authentication regarding who is at the other end.

The concept as described herein by the embodiments is one of setting up a secure context for D2D communication using cellular devices such as user equipment from different operators which furthermore enables authentication between the devices. In such embodiments the operators can be configured to provide via network entitles or base stations an on-demand Internet protocol (IP) based service where the user equipment (or customer) can request a real-time operator quotation (or certificate). The quotation (or certificate) can in some embodiments comprise the following:

An asymmetric (ECC/RSA) public key and/or a DH (Diffie-Hellman) group element originating from the user equipment or cellular device.

A location (for example provided by GPS coordinates) of the access point to which the cellular device is attached to.

A phone number or other identity (IMSI/TMSI) of the cellular device as known by the cellular network.

In some embodiments this information can be signed by a known operator signature key. The known operator signature can for example be the one shared across the network or be formed from keys residing in an operator (public key infrastructure) PKI structure.

A non-limiting example of the cellular communication system is a long-term evolution (LTE) of the Universal Mobile Telecommunications System (UMTS) that is being standardized by the 3rd Generation Partnership Project (3GPP). However it would be understood that other examples of radio access system include those provided by base stations of systems that are based on technologies such as wireless local area network (WLAN) and/or WiMax (Worldwide Interoperability for Microwave Access).

Figure 2A:
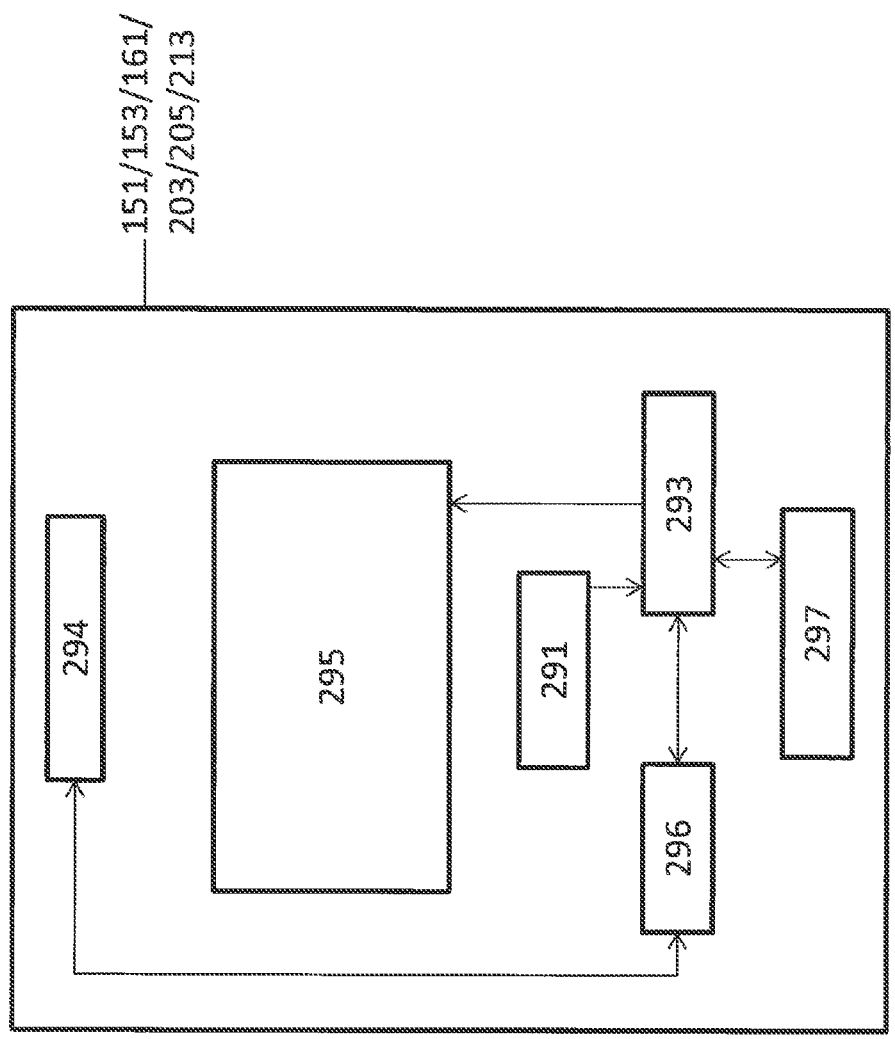
FIG. 2a shows an example user equipment configured to implement certain embodiments.

FIG. 2a shows a schematic view of an example of user equipment (or D2D device) (UE) 6 that may be used for communicating with the base stations of FIG. 1 (or FIG. 3) via a wireless interface. The UE 6 may be any device capable of at least sending or receiving radio signals to or from the base stations of FIG. 1 (or FIG. 3) and additionally may be capable of sending and receiving signals to from another UE in Device-to-Device (D2D) communications.

The UE 151, 153, 161, 203, 205, 213 may, for example, be a device designed for tasks involving human interaction such as making and receiving phone calls between users, and streaming multimedia or providing other digital content to a user. Non-limiting examples include a smart phone, and a laptop computer/notebook computer/tablet computer/e-reader device provided with a wireless interface facility. The UE 151, 153, 161, 203, 205, 213 may communicate via radio transceiver circuitry, unit or module 296 and associated antenna arrangement 294 comprising at least one antenna or antenna unit. The antenna arrangement 294 may be arranged internally or externally to the UE 151, 153, 161, 203, 205, 213.

The UE 151, 153, 161, 203, 205 and 213 may be provided with: a baseband unit comprising one or more baseband processors 293; and at least one memory or data storage entity 297. The baseband processor 293 and one or more memory entities 297 may be provided on an appropriate circuit board and/or in chipsets. The memory or data storage entity 297 is typically internal but may also be external or a combination thereof, such as in the case when additional memory capacity is obtained from a service provider.

In the cases of devices designed for human interaction, the user may control the operation of the UE 151, 153, 161, 203, 205, 213 by means of a suitable user interface such as key pad 291, voice commands, touch sensitive screen or pad, combinations thereof or the like. A display 295, a speaker and a microphone may also be provided. Furthermore, the UE 151, 153, 161, 203, 205, 213 may comprise appropriate connectors (either wired or wireless) to other devices and/or for connecting external accessories, for example hands-free equipment, thereto.

Figure 2B:
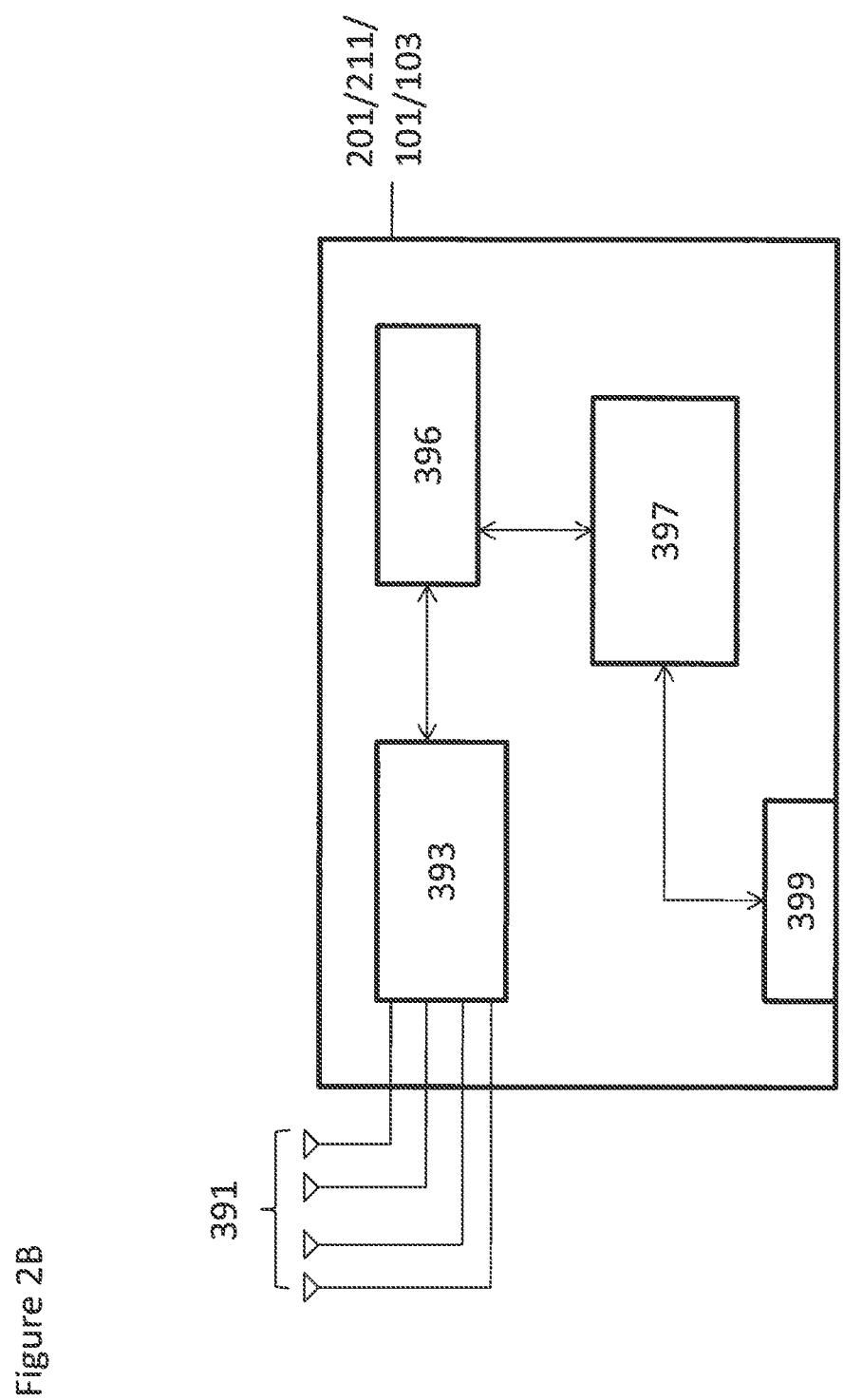
FIG. 2b shows an example network base station or controller configured to implement certain embodiments.
Figure 3:
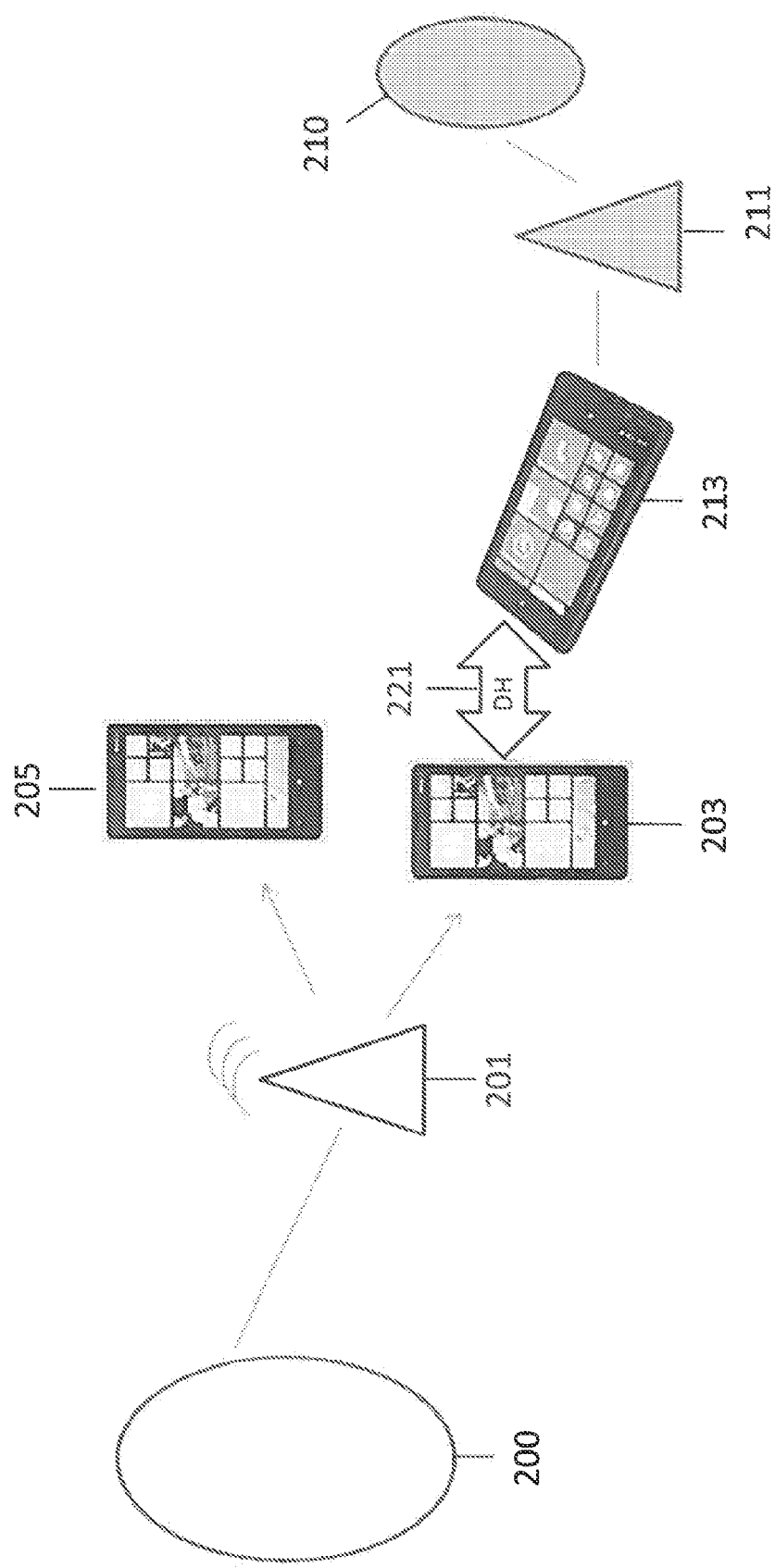
FIG. 3 shows a schematic diagram of a further D2D system where certain embodiments can be implemented.

FIG. 2b shows one example of apparatus for use at the base station 101, 103 of FIG. 1 or the base station 201, 211 of FIG. 3. The apparatus comprises or is coupled to a radio frequency antenna array 391 (comprising at least one antenna or antenna unit) configured to receive and transmit radio frequency signals; radio transceiver circuitry, module or unit 393 configured to interface the radio frequency signals received and transmitted by the antenna array 391; and a baseband unit comprising one or more baseband processors 396. The apparatus usually comprises an interface 399 via which, for example, the baseband processor 396 can communicate with other network elements such as the core network (not shown). The baseband processor 396 is configured to process signals from the radio transceiver 393. It may also control the radio transceiver 393 to generate suitable RF signals to communicate information to UEs 151, 153, 161, 203, 205, 213 via a wireless communications link, and also to exchange information with other network nodes 200, 210 and/or other eNBs 151, 153, 161, 203, 205, 213 across a wired link via the interface 399. The one or more memory or data storage units 397 are used for storing data, parameters and/or instructions for use by the baseband processor 396. The memory or data storage entity may be internal or external (locating in another network entity) or a combination thereof.

In some embodiments the baseband unit comprising the baseband processor 396 is located remotely from the radio transceiver 393 and the antenna array 391, and is connected to the radio transceiver 393 by e.g. a fibre optic link.

The memories 297, 397 may be implemented using a suitable data storage technology, such as, for example, semiconductor based memory devices, flash memory, magnetic memory devices and systems, optical memory devices and systems, fixed memory and removable memory. The data processors 293, 396 may, for example, include one or more of microprocessors, digital signal processors (DSPs) and processors based on a multi-core processor architecture.

References below to processors 293, 396 controlling the operation of other elements of UEs 151, 153, 161, 203, 205, 213 and base stations 201, 211, 101, 103 refer to the processors operating in accordance with program code stored at memories 297, 397.

It would be appreciated that the apparatus shown in each of FIGS. 2a and 2b described above may comprise further elements which are not directly involved with the embodiments described hereafter.

FIG. 3 shows a further example communication system showing an example D2D Security Association being formed between a first user equipment 203 and a second user equipment 213. In this example the first user equipment 201 and the second user equipment are operating using different base stations from different operators, however it would be understood that similar operations can be performed with respect to user equipment operating as D2D devices using the same operator and/or base station. Furthermore with respect to FIG. 4 a flow diagram showing the operations performed with respect to generating the D2D security association according to some embodiments is shown.

In the example shown in FIG. 3 there is a first user equipment UE1 203 which is located proximate to a second user equipment UE2 213. In the example shown in FIG. 3 the first user equipment 203 communicates with a first base station 201. The first base station 201 furthermore can be configured to communicate with a further user equipment 205 and also to a core network (CN) or base station control node 200. Furthermore the second user equipment 213 can be configured to communicate with a second base station 211 which in turn can be configured to communicate with a second core network (CN 2) or second base station control node 210.

In some embodiments the first user equipment UE1 203 and the second user equipment UE2 213 can discover each other in the radio space. As described herein it would be understood that in some embodiments the user equipment can belong to different operators or the same operator. In the following examples the different user equipment can discover each other directly over the air or in other ways. Examples describe use of specific discovery patterns and groups of discovery patterns applicable to nodes operating in a frame based system. D2D communication discovery in some embodiments may use TDD (time division duplexing) technology or FDD (Frequency Division Duplexing) technology. In some embodiments the discovery patterns used by each user equipment can be built on top of a frame based communication arrangement. In such embodiments the user equipment can be assumed to be synchronized with each other.

In some embodiments the discovery of devices or user equipment can be controlled by providing different discovery patterns of transmission and reception phases for different devices in the network for transmission and reception of discovery information between the devices. In such embodiments a network entity responsible for allocating the discovery patterns can also control the reservation/assigning of those resources for the devices that are a part of the discovery. For example, for D2D an appropriate controlling network entity may comprise an eNB or base station or another access point in control of allocation of discovery patterns. Generally speaking, the control can be logically provided by a network node on the highest hierarchy level in a certain geographical area. The operation of discovery is known and is not discussed further.

The operation of discovery between the first user equipment UE1 203 and the second user equipment UE2 213 is shown in FIG. 4 by step 301.

In some embodiments the user equipment (or D2D devices) can be configured to set up a Diffie-Hellman pipe or shared secret. In some embodiments the Diffie-Hellman pipe uses 2K keys (in other words the shared secret is one with 2048 bits) however any suitable length shared secret can be generated. In some embodiments the keys used to set up the Diffie-Hellman pipe should be 'fresh' in other words generated in real-time and not ephemeral or old keys.

The operation of generating a Diffie-Hellman pipe between the first user equipment (UE1) 203 and the second user equipment (UE2) 213 is shown in FIG. 4 by step 303.

In some embodiments any suitable fresh challenge is exchanged between the user equipment using the established security context provided by the Diffie-Hellman pipe. The fresh challenge and/or response can then be used in the following operations.

In some embodiments, within the user equipment, having generated a Diffie-Hellman pipe (in other words having established a shared secret), the generated Diffie-Hellman pipe secret (or challenge) is used as an identifier to generate a Diffie-Hellman security context request. In other words using an identifier uniquely derived from the shared secret a request is generated within each user equipment.

The operation of generating a security context request is shown in FIG. 4 in the first user equipment 203 by the step 350 and in the second user equipment 213 by step 351.

This request can then be sent to a respective base station.

In FIG. 4 it is shown that the first user equipment (UE1) 203 sends the request to the associated base station 201 in step 304.

Similarly the second user equipment (UE2) 213 transmits the request to the second base station 211 in step 305.

In some embodiments the base station for each of the user equipment can then forward this request to a suitable core network node or base station controller node.

The operation of forwarding the request from the first base station 201 to the first core network node or base station controller node 200 is shown in FIG. 4 by step 306.

Similarly the operation of forwarding the request from the second base station 211 to the second core network node or base station controller node 210 is shown in FIG. 4 by step 307.

It would be understood that in some embodiments the respective base station can perform the quotation generation operation described herein and as such there is no requirement to forward the request to the core network node or base station controller (in other words the forwarding the request and the respective receiving the quotation from the core network node or base station controller node is an optional operation where the base station can perform the generation of the quotation or certificate).

In some embodiments the core network node or base station controller node can then generate a real-time operator quotation or certificate comprising the following information under the security context of the cellular network.

Firstly the quotation can in some embodiments comprise an asymmetric (ECC/RSA) public key and/or a DH (Diffie-Hellman) group element originating from the user equipment or cellular device.

Secondly the quotation can in some embodiments comprise a location (for example provided by GPS coordinates) of the access point to which the cellular device is attached to.

Thirdly in some embodiments the quotation can comprise a phone number or other identity, for example an International Mobile Subscriber Identity/1 Temporary Mobile Subscriber Identity (IMSI/TMSI) of the cellular device as known by the cellular network.

The operation of generating the quotation/certificate in the first network is shown in FIG. 4 by step 360.

Furthermore the operation of generating the quotation in the second network is shown in FIG. 4 by step 361.

The quotation can then be sent back via the respective base station to the user equipment using the cellular security context.

Thus for example in FIG. 4 the quotation/certificate is sent from the first core network node or base station controller node to the base station in step 308. The quotation is then forwarded from the base station 201 to the first user equipment 203 in step 310.

Similarly with respect to the second network the quotation/certificate is sent from the second core network node or base station controller node to the second base station in step 309. The quotation is then forwarded from the second base station 211 to the second user equipment 213 in step 312.

The first user equipment 203 can then be configured to pass to the second user equipment 213 the signed quotation/certificate from the first network. Similarly the second user equipment 213 can be configured to transfer the quotation/certificate from the second network to the first user equipment 203.

The operation of transferring the quotation/certificate over the protected security context is shown in FIG. 4 by step 313.

The user equipment having received the quotation/certificate from the peer user equipment is in some embodiments configured to analyse or checks that the certificate comprises the same Diffie-Hellman shared secret. In other words, determining that the counterpart is the other endpoint of the Diffie-Hellman pipe.

Furthermore the user equipment receiving the quotation/certificate from the peer user equipment is configured in some embodiments to check the quotation/certificate to determine that the certificate comprises a location which is consistent with the current location of the user equipment or D2D device. In other words, that the user equipment or D2D device which is attempting to participate in a device to device communication is within a determined range and substantially within the same geographical location.

Furthermore the user equipment receiving the quotation/certificate from the peer user equipment is configured in some embodiments to check the quotation/certificate to determine that the certificate comprises a signature from a known and trusted operator.

Where the user equipment determines that the checks are passed. For example that in some embodiments the quotation/certificate contains valid responses in comprising the same DH secret, similar location, and a signature from a known and trusted operator then the user equipment determines that the other user equipment is authenticated and communication between the user equipment can begin.

In some embodiments the quotation/certificate can comprise an identity for the other device which can be stored locally along with the new secret set up under the DH context. In some embodiments by storing the identity for the other device with the new secret future D2D context setups can be performed without the overhead of generating new DH contexts and quotation/certificates.

The operation of checking the certificate from the peer user equipment and determining whether authentication has occurred is shown in the first user equipment 203 in FIG. 4 by step 370 and in the second user equipment in FIG. 4 by step 371.

In some embodiments the verification of the certificate can be performed in the base station associated with the user equipment. Thus in some embodiments the received certificate following step 313 is forwarded to the associated base station for verification.

In some embodiments the verification operation is performed partially in the user equipment and partially in the base station.

In some embodiments the channel allocation for the D2D communication can be included within the transmitted information in other words distributing channel allocation information for user equipment or devices participating in the D2D communication and effectively taking a master role for the allocation.

It would be understood that during handovers in a master cellular network the channel allocation would be renewed.

It is noted that whilst embodiments have been described with reference to LTE, similar principles can be applied to any other communication system or indeed to further developments with LTE. Therefore, although certain embodiments were described above by way of example with reference to certain exemplifying architectures for wireless networks, technologies and standards, embodiments may be applied to any other suitable forms of communication systems than those illustrated and described herein.

The required data processing apparatus and functions of any of the communication devices may be provided by means of one or more data processors. The described functions at each end may be provided by separate processors or by an integrated processor. The data processors may be of any type suitable to the local technical environment, and may include one or more of general purpose computers, special purpose computers, microprocessors, digital signal processors (DSPs), application specific integrated circuits (ASIC), gate level circuits and processors based on multi core processor architecture, as non-limiting examples. The data processing may be distributed across several data processing modules. A data processor may be provided by means of, for example, at least one chip. Appropriate memory capacity can also be provided in the relevant devices. The memory or memories may be of any type suitable to the local technical environment and may be implemented using any suitable data storage technology, such as semiconductor based memory devices, magnetic memory devices and systems, optical memory devices and systems, fixed memory and removable memory.

In general, the various embodiments may be implemented in hardware or special purpose circuits, software, logic or any combination thereof. Some aspects of the invention may be implemented in hardware, while other aspects may be implemented in firmware or software which may be executed by a controller, microprocessor or other computing device, although the invention is not limited thereto. While various aspects of the invention may be illustrated and described as block diagrams, flow charts, or using some other pictorial representation, it is well understood that these blocks, apparatus, systems, techniques or methods described herein may be implemented in, as non-limiting examples, hardware, software, firmware, special purpose circuits or logic, general purpose hardware or controller or other computing devices, or some combination thereof. The software may be stored on such physical media as memory chips, or memory blocks implemented within the processor, magnetic media such as hard disk or floppy disks, and optical media such as for example DVD and the data variants thereof, CD.

In the above various examples of means for implementing the functionalities are given. However, it is noted that these examples do not provide an exhaustive list of means capable of operating in accordance with the inventive principles described herein.

The foregoing description has provided by way of exemplary and non-limiting examples a full and informative description of the exemplary embodiment of this invention. However, various modifications and adaptations may become apparent to those skilled in the relevant arts in view of the foregoing description, when read in conjunction with the accompanying drawings and the appended claims. However, all such and similar modifications of the teachings of this invention will still fall within the spirit and scope of this invention as defined in the appended claims. Indeed there is a further embodiment comprising a combination of one or more of any of the other embodiments previously discussed.

The invention claimed is:

1. An apparatus comprising at least one processor and at least one memory including computer program code for one or more programs, the at least one memory and the computer program code configured to, with the at least one processor, cause the apparatus at least to:
   transmit, to a first network node, a request for a certificate comprising at least one identifier associated with the apparatus, the request comprising a request identifier with a security association established between the apparatus and another apparatus in a device-to-device communication network;
   receive, from the first network node, the certificate;
   forward the certificate to the other apparatus;
   receive, from the other apparatus, another certificate, the other certificate comprising at least one other identifier associated with the other apparatus;
   authenticate the other apparatus based on the other certificate; and
   enable, in response to the authentication, communication with the other apparatus.

2. The apparatus of claim 1, wherein the apparatus is caused to at least:
   discover the other apparatus; and
   establish between the apparatus and the other apparatus the security association.

3. The apparatus of claim 2, wherein establishment between the apparatus and the other apparatus of the security association comprises an establishment of a cryptographic pipe between the apparatus and the other apparatus.

4. The apparatus of claim 3, wherein to forward the certificate to the other apparatus, the apparatus is caused to at least:
   encrypt the certificate with the cryptographic pipe key; and
   transmit the encrypted certificate to the other apparatus.

5. The apparatus of claim 3, wherein receipt of the other certificate from the other apparatus comprises:
   receipt of an encrypted certificate from the other apparatus; and
   generation of the other certificate from the encrypted certificate by decrypting the encrypted certificated based on a key from the cryptographic pipe.

6. The apparatus of claim 1, wherein authentication of the other apparatus based on the other certificate comprises a determination as to whether the at least one other identifier associated with the other apparatus matches a value stored within the apparatus.

7. The apparatus of claim 1, wherein the certificate comprising at least one identifier associated with the apparatus comprises at least one of:
   an asymmetric public key;
   a public identifier derived from a Diffie-Hellman group element originating from the apparatus;
   an identifier based on the established security association between the apparatus and the other apparatus;
   a location of an access point to which the apparatus is associated with;
   a phone number associated with the apparatus;
   an International Mobile Subscriber Identity associated with the apparatus; and
   a Temporary Mobile Subscriber Identity associated with the apparatus.

8. The apparatus of claim 1, wherein the other certificate comprising at least one other identifier associated with the other apparatus comprises at least one of:
   an asymmetric public key;
   a public identifier derived from a Diffie-Hellman group element originating from the other apparatus;
   an identifier based on the established security association between the apparatus and the other apparatus;
   a location of an access point to which the other apparatus is associated with;
   a phone number associated with the other apparatus;
   an International Mobile Subscriber Identity associated with the other apparatus; and
   a Temporary Mobile Subscriber Identity associated with the other apparatus.

9. The apparatus of claim 1, wherein the other certificate is provided by a second network node.

10. An apparatus comprising at least one processor and at least one memory including computer program code for one or more programs, the at least one memory and the computer program code configured to, with the at least one processor, cause the apparatus at least to:
   receive a request from a first apparatus for a certificate comprising at least one identifier associated with the first apparatus, the request comprising a request identifier with a security association established between the first apparatus and a second apparatus in a device-to-device communication network;
   generate the certificate comprising the at least one identifier associated with the first apparatus; and
   transmit the certificate comprising the at least one identifier associated with the first apparatus, wherein the certificate is configured to be exchanged between the first apparatus and the second apparatus to authenticate the first apparatus at the second apparatus to enable communication between the first apparatus and the second apparatus.

11. The apparatus of claim 10, wherein generation of the certificate comprising the at least one identifier associated with the first apparatus comprises determination of at least one of:
   an asymmetric public key associated with the first apparatus;
   a Diffie-Hellman group element originating from the first apparatus;
   a location of an access point to which the first apparatus is associated with;
   a phone number associated with the first apparatus;
   an International Mobile Subscriber Identity associated with the first apparatus; and
   a Temporary Mobile Subscriber Identity associated with the first apparatus.

12. The apparatus of claim 10, wherein receipt of a request from the first apparatus for the certificate comprising at least one identifier associated with the first apparatus comprises receipt of the established security association between the first apparatus and the second apparatus, and wherein generation of the certificate comprising the at least one identifier associated with the first apparatus comprises generation of an identifier based on the established security association between the first apparatus and the second apparatus.

13. An apparatus comprising:
   a requester configured to request, from a first network node, a certificate comprising at least one identifier associated with the apparatus, the request comprising a request identifier with a security association established between the apparatus and another apparatus in a device-to-device communication network;
a first receiver configured to receive the certificate from the first network node;
a forwarder configured to forward the certificate to the other apparatus;
a second receiver configured to receive another certificate from the other apparatus, the other certificate comprising at least one other identifier associated with the other apparatus;
an authenticator configured to authenticate the other apparatus based on the other certificate; and
an enabler configured to enable, in response to the authentication, communication with the other apparatus.

* * * * *